United States Patent
Barbarossa

(10) Patent No.: US 7,929,108 B2
(45) Date of Patent: Apr. 19, 2011

(54) OPTICAL SWITCHING DEVICE WITH RECONFIGURABLE CHANNEL SPACING

(75) Inventor: Giovanni Barbarossa, Saratoga, CA (US)

(73) Assignee: Oclaro (North America), Inc., San Jose, CA (US)

( * ) Notice: Subject to any disclaimer, the term of this patent is extended or adjusted under 35 U.S.C. 154(b) by 212 days.

(21) Appl. No.: 12/032,238

(22) Filed: Feb. 15, 2008

(65) Prior Publication Data

US 2009/0208169 A1  Aug. 20, 2009

(51) Int. Cl.
*G02F 1/29* (2006.01)
(52) U.S. Cl. .............. 349/196; 385/16; 385/22; 359/303
(58) Field of Classification Search .................. None
See application file for complete search history.

(56) References Cited

U.S. PATENT DOCUMENTS

| | | | | |
|---|---|---|---|---|
| 4,850,677 A * | 7/1989 | Okumura | | 349/144 |
| 5,404,236 A * | 4/1995 | Hartmann et al. | | 349/143 |
| 5,414,540 A * | 5/1995 | Patel et al. | | 349/196 |
| 6,327,019 B1 * | 12/2001 | Patel et al. | | 349/196 |
| 6,529,307 B1 * | 3/2003 | Peng et al. | | 359/256 |
| 7,016,098 B2 * | 3/2006 | Giles et al. | | 359/290 |
| 2004/0036834 A1 * | 2/2004 | Ohnishi et al. | | 349/177 |
| 2008/0181559 A1 * | 7/2008 | Corem et al. | | 385/18 |

* cited by examiner

*Primary Examiner* — Mike Stahl
(74) *Attorney, Agent, or Firm* — Patterson & Sheridan, L.L.P.

(57) ABSTRACT

An optical switching device includes an array of liquid crystal macropixels, wherein each macropixel includes at least two liquid crystal subpixels. The subpixels may be controlled together to act as a single polarizing pixel, or independently to act as multiple polarizing pixels. When the switching device processes a WDM having a wide channel spacing, the subpixels are controlled together, and when the switching device processes a WDM having a narrow channel spacing, each subpixel is controlled independently.

15 Claims, 9 Drawing Sheets

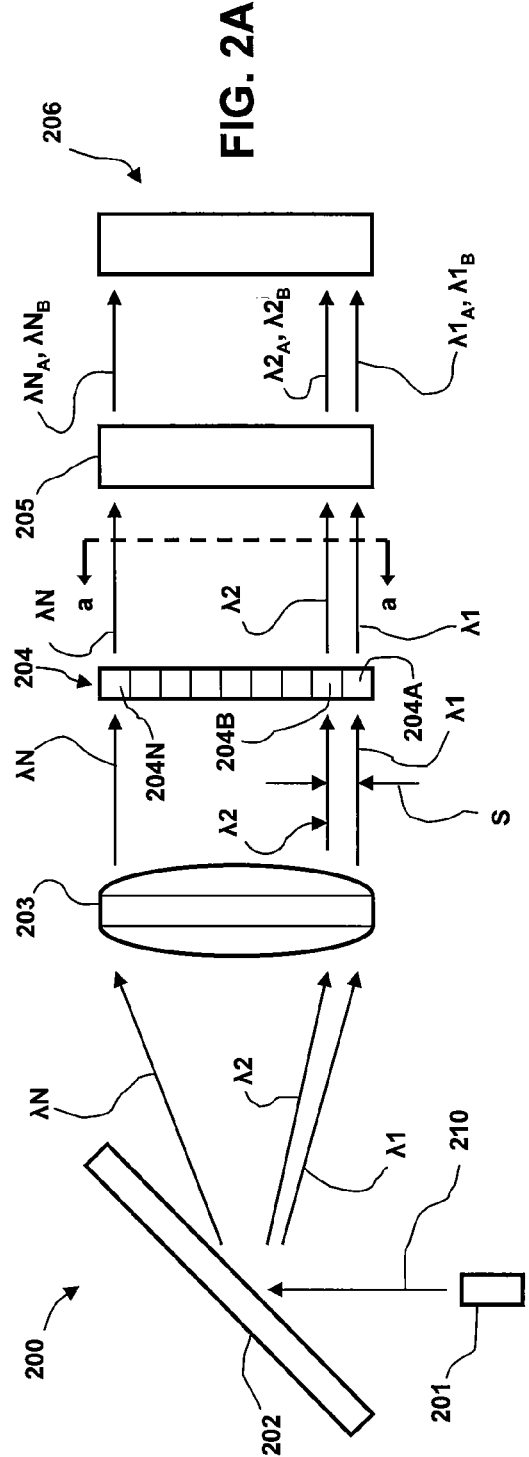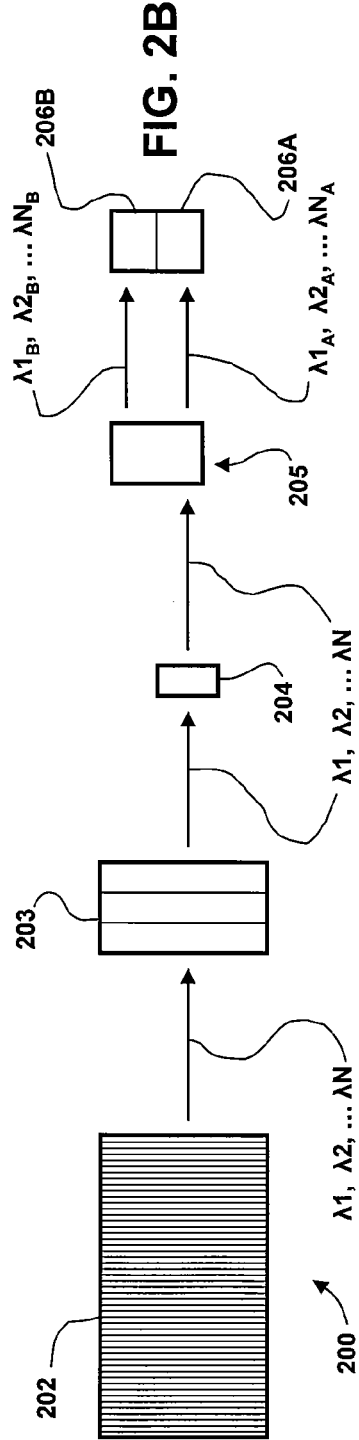

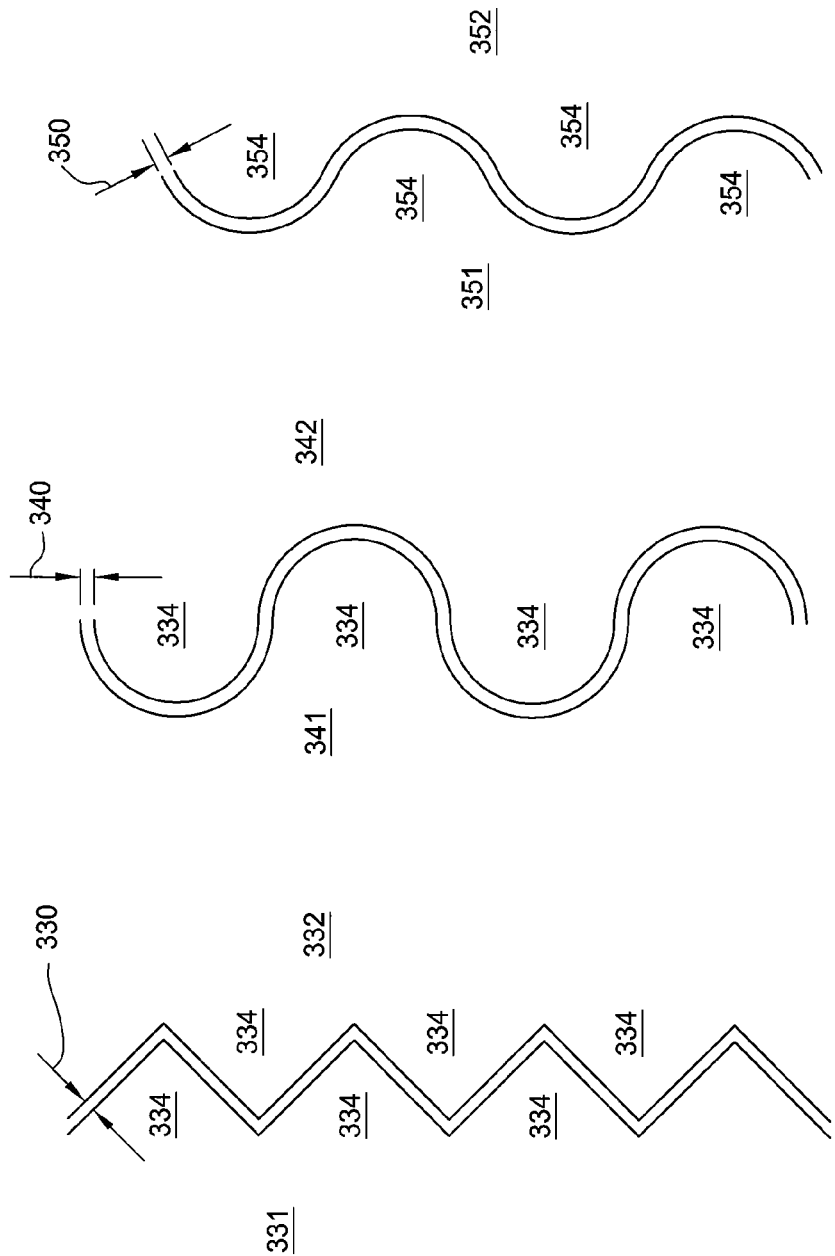

OPTICAL SWITCHING DEVICE WITH RECONFIGURABLE CHANNEL SPACING

BACKGROUND OF THE INVENTION

1. Field of the Invention

Embodiments of the present invention relate generally to optical communication systems and components and, more particularly, to an optical switching device with a reconfigurable channel spacing.

2. Description of the Related Art

In a wavelength division multiplexing (WDM) optical communication system, information is carried by multiple channels, each channel having a unique wavelength. WDM allows transmission of data from different sources over the same fiber optic link simultaneously, since each data source is assigned a dedicated channel. The result is an optical communication link with an aggregate bandwidth that increases with the number of wavelengths, or channels, incorporated into the WDM signal. In this way, WDM technology maximizes the use of an available fiber optic infrastructure; what would normally require multiple optic links or fibers instead requires only one.

As bandwidth requirements for optical communication networks increase, it is desirable to increase the amount of information carried by a single optical fiber. This is typically accomplished by increasing the number of channels in a WDM carried by a fiber, and therefore decreasing the channel spacing of the WDM signal. Channel spacing is the amount of bandwidth allotted to each channel in a WDM communications system, and is defined as the spacing between center wavelengths of adjacent optical channels. For example, a fiber may carry a WDM signal that consists of 10 wavelength channels with a channel spacing of 100 GHz. When the channel spacing of the WDM signal is reduced to 50 GHz, the same fiber may instead carry 20 channels. Therefore, increasing the number of channels in a WDM signal increases the information-carrying capacity of an optical communications network without replacing or increasing the number of fibers in the optical communications network.

However, to convert an existing optical communications network to process WDM signals having a narrower channel spacing, other network hardware must be replaced, including lasers, wavelength lockers, and optical switches, among others. A wavelength selective switch (WSS) is one such component. A WSS is an optical switching device that routes each wavelength channel of a WDM signal from a common input port to one or more output ports. Because a WSS is configured to process a fixed number of wavelength channels with a fixed channel spacing, when the number of wavelength channels of the WDM is increased, the WSS can no longer perform its intended routing function. Hence, for the network to process the more closely packed WDM signal, each WSS contained therein must be either replaced outright or augmented with additional components, such as interleavers and supplemental WSS's. In either case, significant expense and system down-time are associated with the deployment of new optical switching components to enable processing of a WDM with a new, narrower channel spacing. Other optical switching components that require augmentation or replacement include optical add-drop multiplexers (OADMs), dynamic gain equalizers (DGEs), and wavelength selective routers, among others.

Accordingly, there is a need for optical switching devices used in communications networks, such as a WSS's, OADMs, DGEs, and wavelength routers, one wavelength channel spacing when initially deployed and capable of processing one or more narrower channel spacings as required without additional hardware modifications.

SUMMARY OF THE INVENTION

Embodiments of the present invention provide an optical switching device having an array of liquid crystal macropixels, wherein each macropixel includes at least two liquid crystal subpixels. The subpixels may be controlled together to act as a single polarizing pixel, or independently to act as multiple polarizing pixels. When the switching device processes a WDM signal having a wide channel spacing, the subpixels are controlled together, and when the switching device processes a WDM signal having a narrow channel spacing, each subpixel is controlled independently.

In one embodiment, an optical switching device comprises a liquid crystal polarizing pixel having at least two LC subpixels and an optical element positioned in the optical path of the light beams for changing the optical path of the light beams based on a polarization state of the beams. The LC polarizing pixel is configured to modulate the polarization of a light beam having a first channel spacing, and each LC subpixel is configured to modulate the polarization of a light beam having a channel spacing narrower than the first channel spacing.

In another embodiment, an optical switching device comprises at least one input port, at least two output ports, an LC array positioned between the input port and the output ports, the LC array including liquid crystal polarizing pixels that each have at least two LC subpixels, and an optical element positioned in the optical path of the light beams. The optical element, which may be a birefringent crystal or a Wollaston prism, changes the optical path of the light beams based on a polarization state of the beams. The LC polarizing pixel is configured to modulate the polarization of a light beam having a first channel spacing, and each LC subpixel is configured to modulate the polarization of a light beam having a channel spacing narrower than the first channel spacing. The light beams may be wavelength channels demultiplexed from a WDM optical signal. The optical switching device may be a dynamic equalizing wavelength router, a wavelength selective switch, an optical add-drop multiplexer, or a dynamic gain equalizer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 2A and 2B schematically illustrate top plan and side views, respectively, of an LC-based WSS in accordance with one embodiment of the invention.

FIG. 3C-F are partial schematic illustrations of configurations of electrode gaps according to embodiments of the invention.

For clarity, identical reference numerals have been used, where applicable, to designate identical elements that are common between figures. It is contemplated that features of one embodiment may be incorporated in other embodiments without further recitation.

DETAILED DESCRIPTION

Aspects of the invention contemplate an optical switching device such as a WSS, OADM, or DGE, having a configurable channel spacing, wherein switching of wavelength channels is carried out by an array of liquid crystal-based polarization modulators used in conjunction with a beam steering device. The array of polarization modulators is organized as a plurality of liquid crystal (LC) "macropixels," each of which each contains two or more LC "subpixels." When processing a WDM having a wide channel spacing, e.g., 100 GHz, the LC subpixels contained in a given macropixel are controlled together and act as a single LC pixel. When processing a WDM having a narrow channel spacing, e.g., 50 GHz, each subpixel is controlled independently, thus providing switching and routing capacity with a higher spectral resolution.

Figure 1:
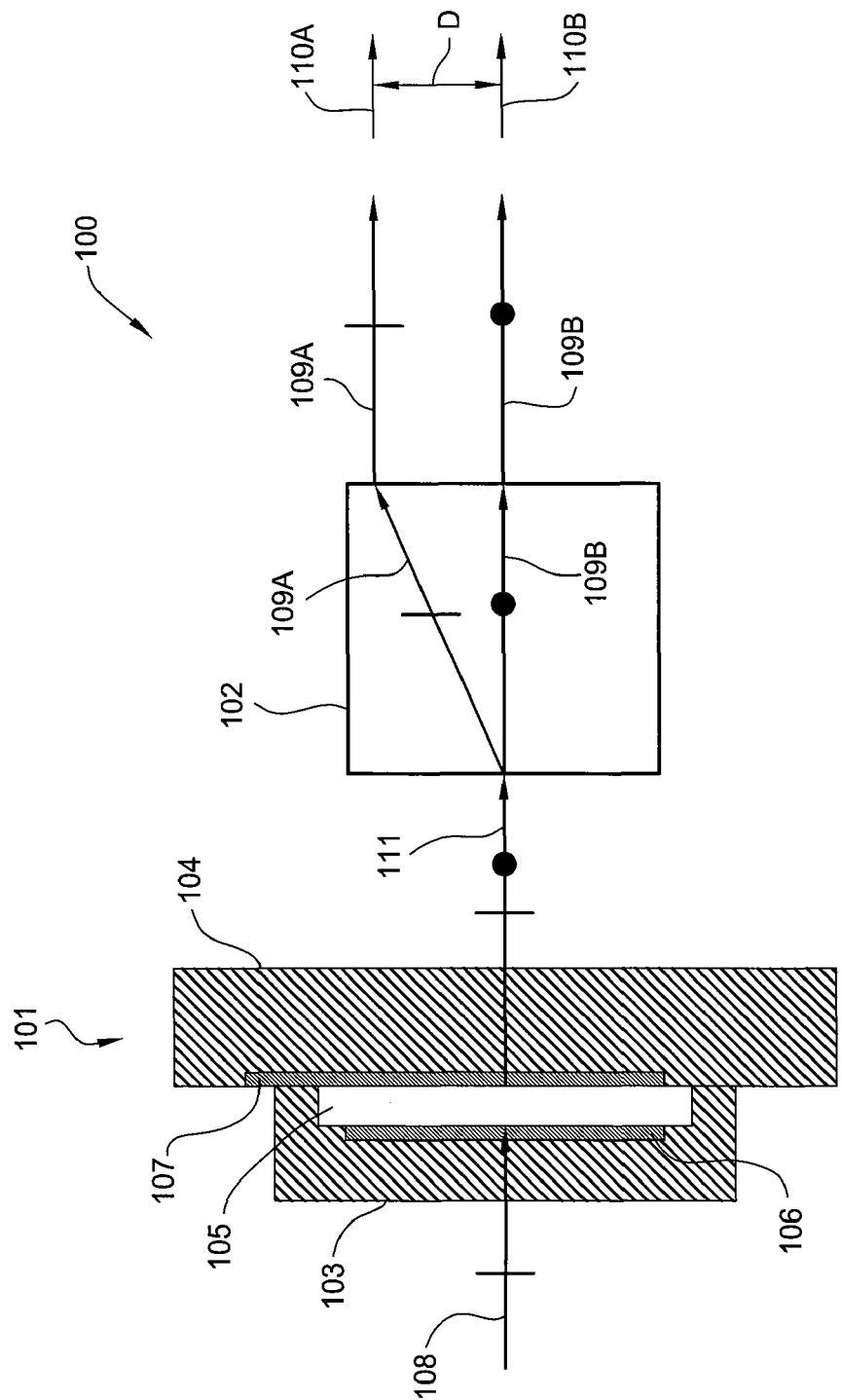
FIG. 1 schematically illustrates a cross sectional view of an LC-based optical switch which may be incorporated into a WSS according to an embodiment of the invention.

FIG. 1 schematically illustrates a cross sectional view of an LC-based optical switch which may be incorporated into a WSS according to an embodiment of the invention. An LC optical switch 100 includes an LC assembly 101 and a beam steering unit 102. In the example shown, LC assembly 101 includes two transparent plates 103, 104, which are laminated together to form LC cavity 105. LC cavity 105 contains an LC material that modulates, i.e., rotates, the polarization of an incident beam of linearly polarized light as a function of the potential difference applied across LC cavity 105. LC assembly 101 also includes two transparent electrodes 106, 107, which are configured to apply the potential difference across LC cavity 105, thereby aligning the LCs in LC assembly 101 to be oriented in a first direction, a second direction or somewhere between these two directions. In this way, LC assembly 101 may modulate the polarization of incident light as desired between the s- and p-polarized states. Transparent electrodes 106, 107 may be patterned from indium-tin oxide (ITO) layers, as well as other transparent conductive materials. Beam steering unit 102 may be a birefringent beam displacer, such as a YVO$_4$ cube, or a Wollaston prism. Beam steering unit 102 is oriented to separate a linearly polarized beam 111 directed from LC assembly 101 into two polarized beams 109A, 109B, wherein each has a polarization state orthogonal to the other, i.e., p- and s-polarized. In the example shown in FIG. 1, polarized beam 109A is p-polarized (denoted by the vertical line through the arrow representing polarized beam 109A), and polarized beam 109B is s-polarized (denoted by a dot).

In operation, LC optical switch 100 conditions a linearly polarized input beam 108 to form one or two polarized beams 109A, 109B, as shown in FIG. 1. LC optical switch 100 then directs polarized beam 109A along optical path 110A and polarized beam 109B along optical path 110B. For a switching operation, in which a beam is routed along one of two optical paths, LC optical switch 100 converts all of the optical energy of input beam 108 to either polarized beam 109A or 109B. For an attenuating operation, LC optical switch 100 converts a portion of the optical energy of input beam 108 into polarized beam 109A and a portion into polarized beam 109B, as required.

In the example illustrated in FIG. 1, input beam 108 is a beam of p-polarized light, denoted by a vertical line through the arrow representing input beam 108. Input beam 108 passes through LC assembly 101 and is directed through the LC contained in LC cavity 105 to produce linearly polarized beam 111. When input beam 108 passes through LC cavity 105, the polarization state of the beam may be rotated 90°, left unchanged, i.e., rotated 0°, or modulated somewhere in between, depending on the molecular orientation of the LC material contained in LC cavity 105. Therefore, linearly polarized beam 111 may contain an s-polarized component and a p-polarized component. Beam steering unit 102 produces polarized beam 109A from the p-polarized component of linearly polarized beam 111, and polarized beam 109B from the s-polarized component of linearly polarized beam 111, as shown in FIG. 1. Beam steering unit 102 is oriented to direct polarized beam 109A along optical path 110A and polarized beam 109B along optical path 110B, where optical paths 110A, 110B are parallel optical paths separated by a displacement D. The magnitude of displacement D is determined by the geometry and orientation of beam steering unit 102.

FIGS. 2A and 2B schematically illustrate top plan and side views, respectively, of an LC-based WSS in accordance with one embodiment of the invention. In the example illustrated in FIGS. 2A and 2B, WSS 200 includes an optical input port 201, a diffraction grating 202, a lens 203, an LC array 204, a beam steering device 205, and an output/loss port assembly 206.

A WDM input signal, beam 210, is optically coupled to diffraction grating 202 by optical input port 201. Diffraction grating 202 demultiplexes beam 210 into a plurality of N wavelength channels λ1-λN, wherein each of wavelength channels λ1-λN is spatially separated from the other channels along a unique optical path, as shown in FIG. 2A. In the example shown, the unique optical paths followed by wavelength channels λ1-λN are positioned in the same horizontal plane. Wavelength channels λ1-λN are optically coupled to LC array 204 by lens 203. The spatial separation S between each wavelength channel is proportional to the channel spacing of beam 210. For example, the spatial separation S between demultiplexed wavelength channels with a 100 GHz channel spacing is twice that for a 50 GHz channel spacing.

LC array 204 contains a plurality of LC macropixels 204A-204N, each of which is positioned to correspond to one of wavelength channels λ1-λN. Each LC macropixel 204A-204N of LC array 204 may be substantially similar in configuration and operation to LC assembly 101 in FIG. 1, and is independently controlled. The organization of macropixels 204A-204N in LC array 204 is described below in conjunction with FIG. 2B. As wavelength channels λ1-λN pass through LC array 204, the polarity of each wavelength channel is conditioned as required by the associated macropixel. As described above in conjunction with FIG. 1, for a switching operation, the corresponding LC macropixel of LC array 204 converts all of the optical energy of the wavelength channel to either s-polarized or p-polarized. For an attenuating operation, the corresponding LC macropixel converts a portion of a wavelength channel to s-polarized and a portion to p-polarized, as required. Hence each wavelength channel, or a portion thereof, that is to be routed to output port 206A is conditioned with a first polarization state, and each wavelength channel, or portion thereof, that is to be routed to output port 206B is conditioned with a second polarization state that is orthogonal to the first. For example, wavelength channels bound for output port 206A may be p-polarized and wavelength channels bound for output port 206B may be s-polarized, or vice-versa.

After conditioning by LC array 204, wavelength channels λ1-λN pass through beam steering device 205, which is substantially similar to beam steering unit 102 of FIG. 1. Therefore, depending on the polarization state of each wavelength channel, beam steering device 205 steers each wavelength channel along an upper optical path, a lower optical path, or a portion along both, as depicted in FIG. 2B. In this way, beam steering device 205 directs s-polarized beams to one output port and p-polarized beams to the other output port, i.e., wavelength channels $\lambda 1_A$-$\lambda N_A$ are directed to output port 206A and wavelength channels $\lambda 1_B$-$\lambda N_B$ are directed to output port 206B. It is noted that when WSS 200 performs an attenuation operation on wavelength channels λ1-λN, one of the output ports 206A, 206B may act as a loss port and the other as a conventional output port.

Figure 2C:
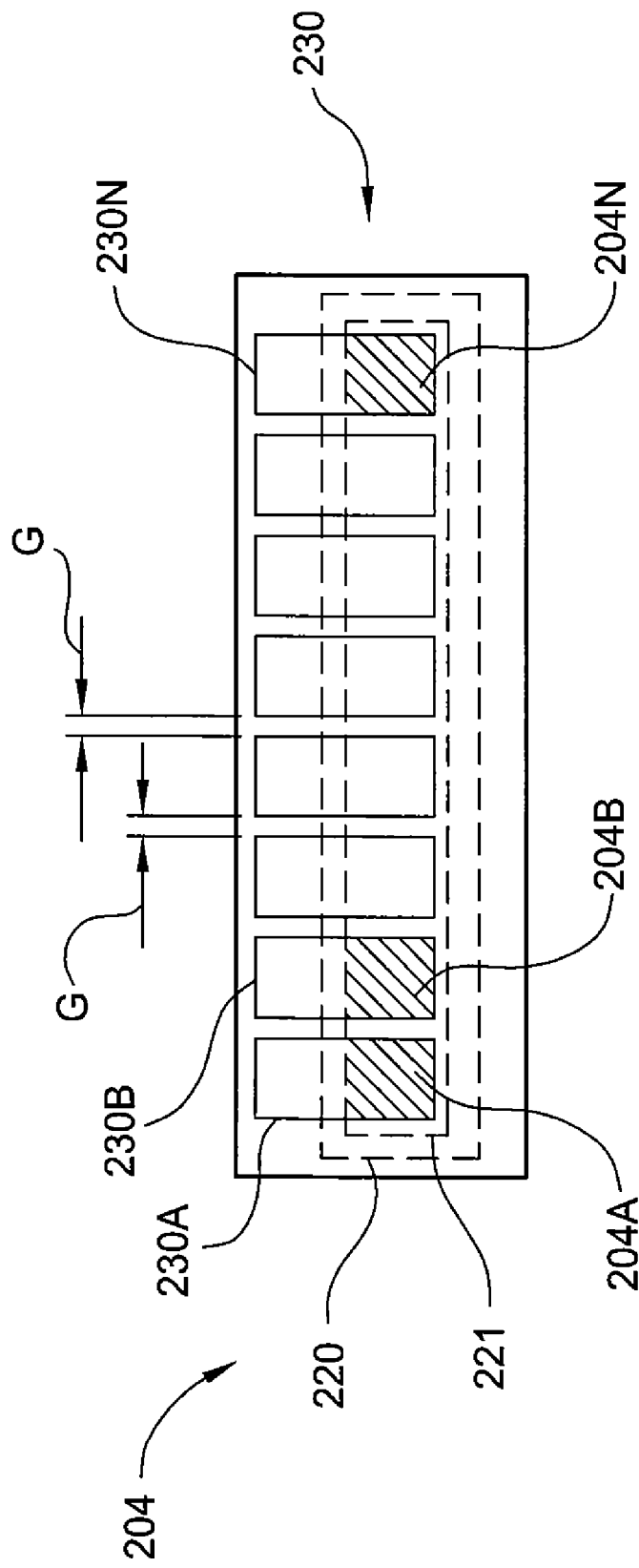
FIG. 2C schematically illustrates a cross-sectional view of an LC array taken at section line a-a, as indicated in FIG. 2A.

FIG. 2C schematically illustrates a cross-sectional view of LC array 204 taken at section line a-a, as indicated in FIG. 2A. LC array 204 includes an LC cavity 220 containing an LC material, a common horizontal electrode 221, and an array 230 of vertical electrodes 230A-230N. Common horizontal electrode 221 is positioned behind LC cavity 220, and may be substantially similar in make-up to transparent electrode 106, described above in conjunction with FIG. 1. In the example shown in FIG. 2B, common horizontal electrode 221 serves as an electrode for all LC macropixels 204A-204N (shaded regions) of LC array 204. Array 230 of vertical electrodes 230A-230N is adjacent LC cavity 220 and opposite common horizontal electrode 221, and each vertical electrode is positioned appropriately so that the desired wavelength channel is incident on the requisite vertical electrode. Vertical electrodes 230A-230N are electrically isolated from each other by a gap G, and each vertical electrode serves as the second electrode for an LC macropixel of LC array 204, similar to transparent electrode 107 in FIG. 1. Thus, each macropixel 204A-204N is defined by a region of LC cavity 220 located between common horizontal electrode 221 and one of the vertical electrodes of array 230. For example, LC macropixel 204A is the shaded region in FIG. 2B corresponding the portion of LC cavity 220 that is between common horizontal electrode 221 and vertical electrode 230A. As noted above in conjunction with FIG. 2A, each LC macropixel of LC array 204 is positioned to correspond to a demultiplexed wavelength channel of beam 210 when the wavelength channel spacing is a wide channel spacing.

Figure 3A:
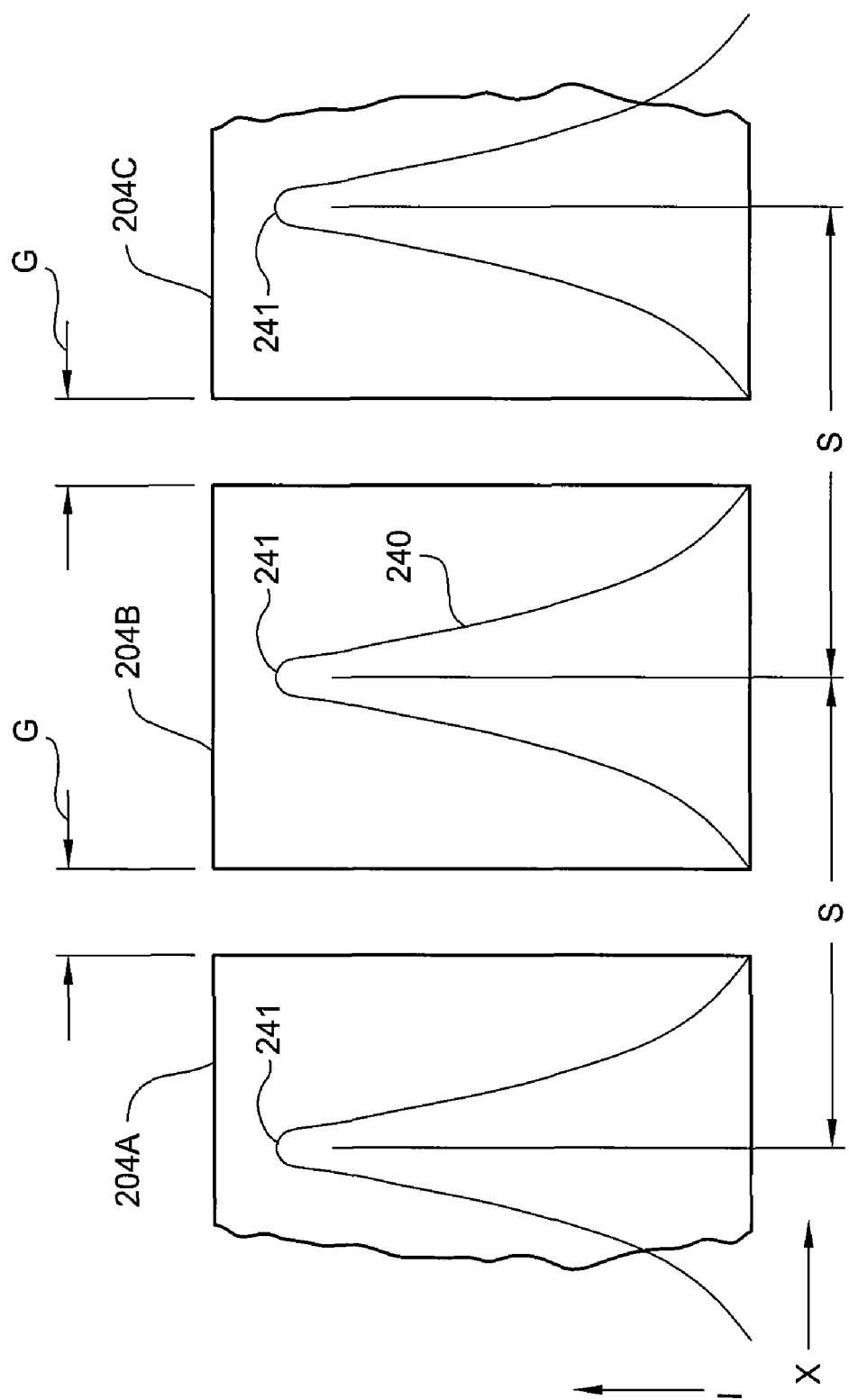
FIG. 3A is a partial schematic view of an LC array including LC macropixels.

FIG. 3A is a partial schematic view of LC array 204 including LC macropixels 204A-C. For illustrative purposes, a graph 240 is superimposed on each LC macropixel depicting the light intensity (I) distribution of an incident demultiplexed beam vs. horizontal position (X), wherein the beam has a wide channel spacing, e.g., 100 GHz. As shown, incident light for each wavelength channel reaches a maximum intensity at a peak 241 on one LC macropixel. The horizontal position X of each peak 241 corresponds to the center wavelength of the wavelength channel directed at a given macropixel. In order to maximize the portion of a given wavelength channel that is conditioned by a corresponding macropixel, each macropixel of LC array 204 may be positioned so that peak 241 is centered in each macropixel, as shown. If peak 241 is substantially off-center in a macropixel, a portion of the incident wavelength channel may be directed into a bordering gap G, leading to unwanted scattering of optical energy. For reference, spatial separation S, described above in conjunction with FIG. 2A, is indicated in FIG. 3A. Spatial separation S between wavelength channels λ1-λN of beam 210 is proportional to the channel spacing of beam 210 and, as shown in FIG. 3A, is equal to the distance between each peak 241.

Figure 3B:
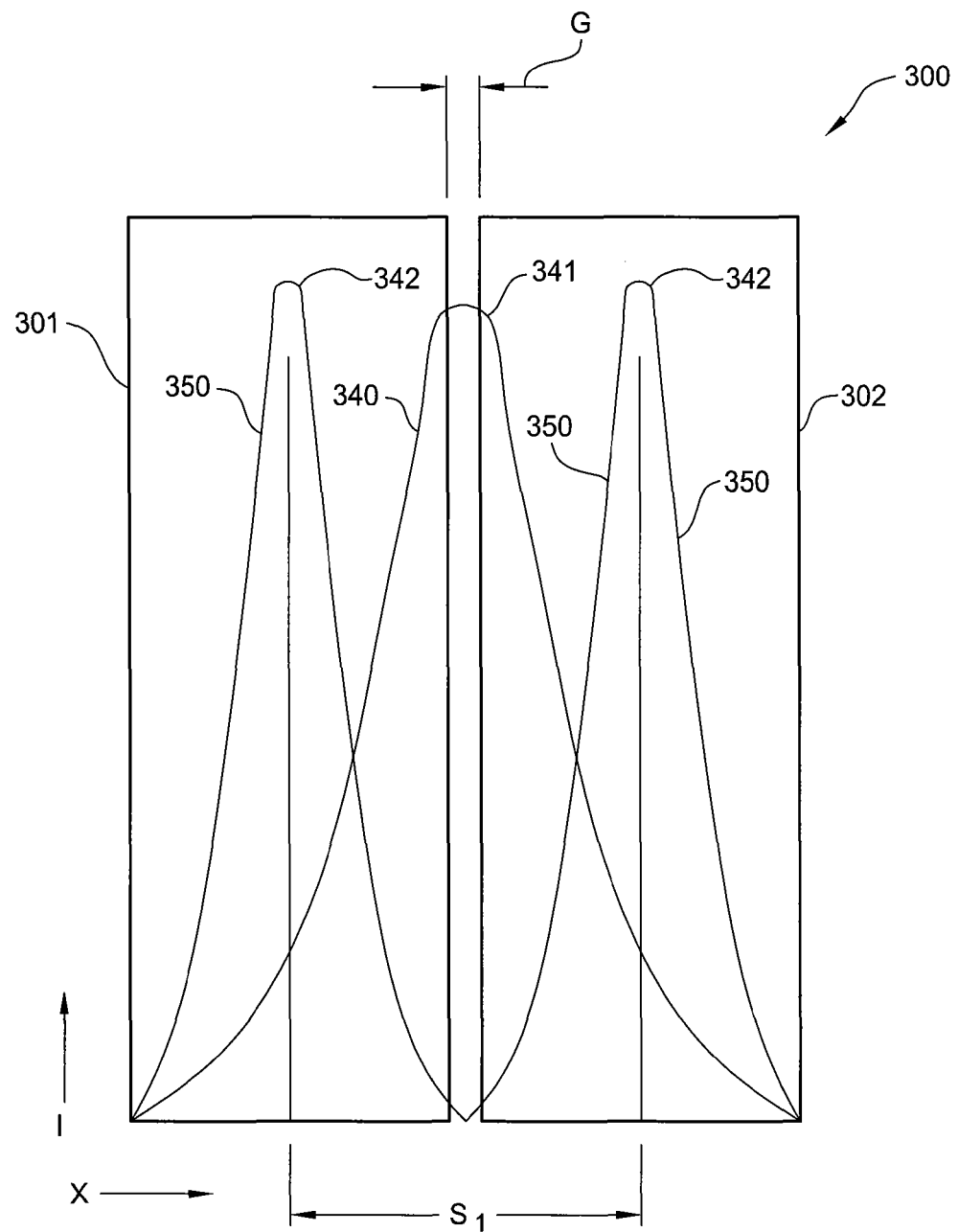
FIG. 3B is a schematic view of an LC macropixel according to one embodiment of the invention.

FIG. 3B is a schematic view of an LC macropixel according to one embodiment of the invention. Macropixel 300 is configured substantially the same as a macropixel of LC array 204, described above, except that macropixel 300 includes two subpixels, 301, 302. Each subpixel 301, 302 is formed by a dedicated vertical electrode, and therefore each subpixel 301, 302 may be independently controlled. Macropixel 300 and may be incorporated into the LC array of an LC-based WSS, such as WSS 200, described above in conjunction with FIGS. 2A and 2B, or other LC-based optical switching devices.

Superimposed onto macropixel 300 are two graphs, 340 and 350. Graph 340 depicts the light intensity (I) distribution of a single wavelength channel from a first demultiplexed beam vs. horizontal position (X), wherein the first beam has a wide channel spacing, e.g., 100 GHz. Graph 350 depicts the light intensity distribution of two adjacent wavelength channels from a second, demultiplexed beam vs. horizontal position X, wherein the second beam is a "closely packed" beam, i.e., having a channel spacing that is one half the spacing of the first beam, e.g., 50 GHz. As shown in FIG. 3B, two wavelength channels of the closely packed beam are incident on macropixel 300, whereas only one channel of the first beam is incident on macropixel 300. This is due to the proportionally smaller spatial separation $S_1$ between wavelength channels of the closely packed beam after demultiplexing compared to the spatial separation between each wavelength channel of the first beam. Spatial separation $S_1$ is equal to the distance between each peak 342 of the closely packed WDM beam, whereas the spatial separation between channels of the first beam is equal to the distance between each peak 341. For example, when a WDM beam having a channel spacing of 100 GHz is demultiplexed and directed at an array containing a plurality of macropixels 300, one wavelength channel is directed to and centered on each macropixel 300. When a WDM beam having a channel spacing of 50 GHz is demultiplexed and directed at the array, two wavelength channels are directed to each macropixel 300, one wavelength channel centered on subpixel 301 and one on subpixel 302, as shown in FIG. 3B.

By incorporating an array of LC macropixels 300 into an LC-based optical switching device, such as WSS 200 shown in FIGS. 2A and 2B, the optical switching device has a reconfigurable channel spacing. Namely, the optical switching device may be used to process WDM signals having a first channel spacing or second channel spacing, wherein the second channel spacing is twice the density of the first, and wherein no hardware modifications are necessary to change between channel spacings. This is because the two subpixels contained in each macropixel may be controlled together at the wider channel spacing, and therefore may act as a single beam polarizing pixel. At the narrower channel spacing, each subpixel serves as an independently controlled polarizing pixel.

As noted above, the electrodes that form macropixels and subpixels of an LC array are electrically isolated by a gap G. As shown in FIG. 3B, gap G between subpixels 301, 302 is located at the region of maximum incident light intensity when subpixels 301, 302 are configured to act as a single polarizing pixel. The portion of optical energy of a wavelength channel that is incident on gap G is not conditioned in a controlled manner, since LC material located outside defined pixels is scattered randomly, adding unwanted noise to optical signals. Gap G may be on the order of about 1-5 μm wide, and the width of macropixel 300 may be on the order of 100's of λm, therefore the portion of a wavelength channel incident on macropixel 300 that is directed at gap G may be relatively small. However, because gap G is coincident with the region of highest incident light intensity, i.e., peak 341, gap G may be still be a significant source of unwanted scattering and signal loss when subpixels 301, 302 operate as a single polarizing pixel. To minimize this effect, it is contemplated that the area of gap G may be minimized. For example, using standard lithographic methods known in the art, the vertical electrodes of subpixels 301, 302 may be formed with a sub-micron gap. When necessary, critical dimensions of electronic devices may be formed as small as 100's of nm. Hence, by reducing the width of gap G from 3 μm to 0.3 μm, the area of gap G, and therefore the portion of optical energy lost therethrough, is reduced by a factor of 10.

As noted above, gap G is positioned in the region of highest intensity incident light when subpixels 301, 302 are configured to act as a single polarizing pixel. Therefore, to further minimize unwanted scattering and signal loss associated with the gap between pixel electrodes, it is contemplated that the geometry of the electrode gap may be modified from a narrow rectangular region in order to minimize the surface area of the electrode gap that is coincident with the highest intensity light. In this way, significant portions of the electrode gap fall outside the region of highest intensity light, thereby reducing the total light lost through the electrode gap.

Figure 3C:
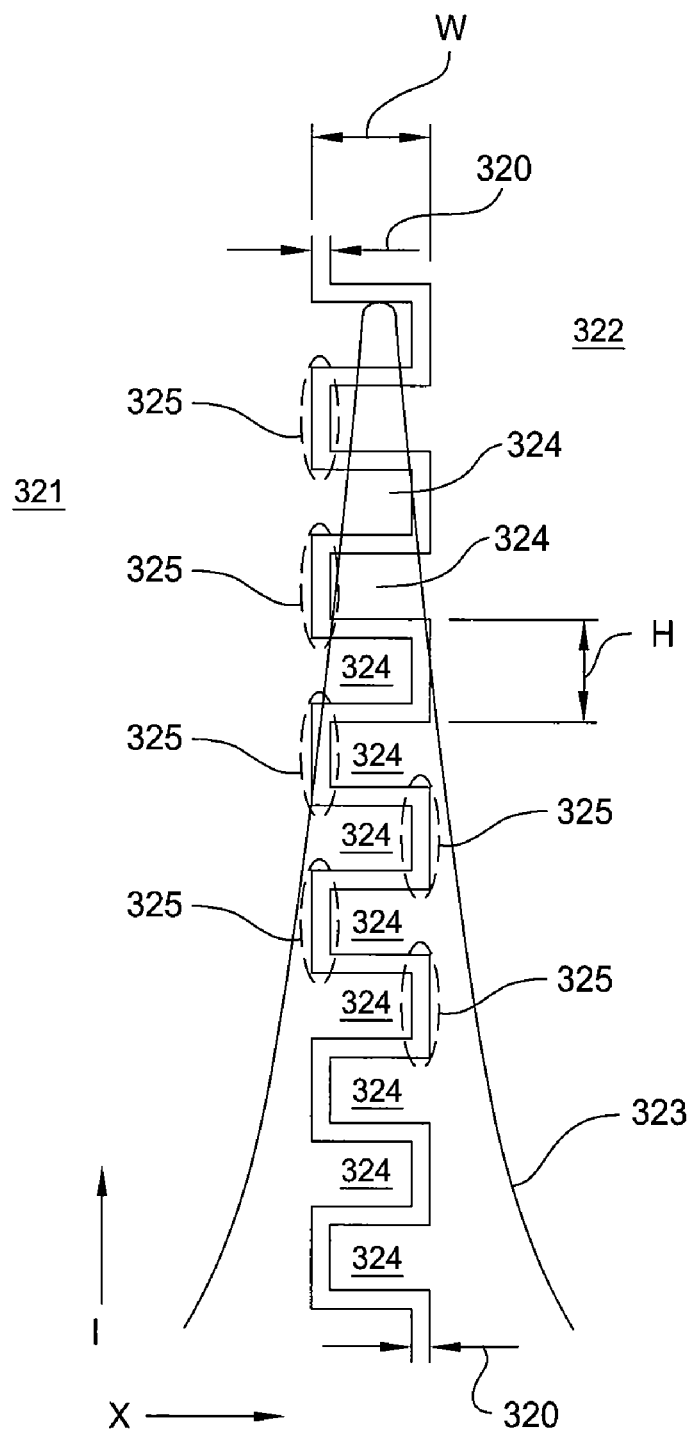

FIG. 3C is a partial schematic illustration of one configuration of an electrode gap 320 according to an embodiment of the invention. Electrode gap 320 is located between two subpixels 321, 322 of an LC macropixel. Superimposed on subpixels 321, 322 is a graph 323 depicting the light intensity (I) distribution of an incident wavelength channel vs. horizontal position (X), wherein the channel has a wide channel spacing and therefore is conditioned by subpixels 321, 322 simultaneously. In this embodiment, the adjacent edges of subpixels 321, 322 include a plurality of interleaving features 324. This configuration allows most portions of electrode gap 320, such as the regions 325, to fall outside the region of highest intensity incident light. So although the total area of electrode gap 320 is greater than the area of a simple rectangular strip, as illustrated by gap G in FIG. 3B, the total optical energy lost through electrode gap 320 may be reduced. It is noted that the height H and width W of the interleaving features 324 of electrode gap 320 may require optimization to realize a reduction in optical energy loss through electrode gap 320. In addition, the area of electrode gap 320 may be further decreased by forming electrode gap 320 with a sub-micron width, e.g., 300 nm.

Other configurations of interleaving features are also contemplated, including triangular, semi-circular, and sinusoidal features. FIG. 3D is a partial schematic illustration of one configuration of an electrode gap 330 according to an embodiment of the invention. Electrode gap 330 is located between two subpixels 331, 332 of an LC macropixel and includes interleaving triangular features 334. FIG. 3E is a partial schematic illustration of another configuration of an electrode gap 340 according to an embodiment of the invention. Electrode gap 340 is located between two subpixels 341, 342 of an LC macropixel and includes interleaving semicircular features 344. FIG. 3F is a partial schematic illustration of another configuration of an electrode gap 350 according to an embodiment of the invention. Electrode gap 350 is located between two subpixels 351, 352 of an LC macropixel and includes interleaving sinusoidal features 354.

Figure 3G:
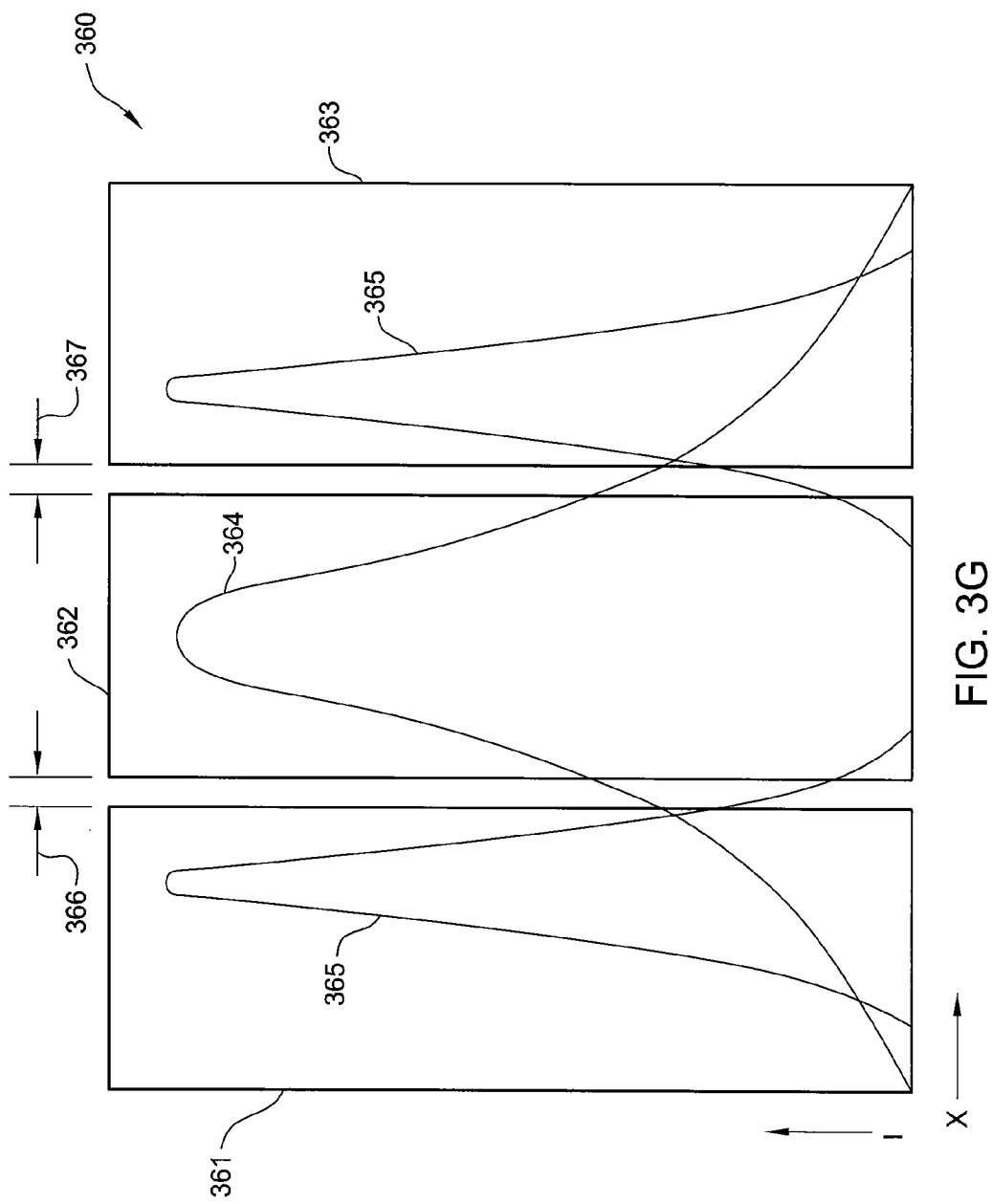
FIG. 3G is a schematic illustration of one configuration of a macropixel according to an embodiment of the invention.

It is further contemplated that the electrode gaps between subpixels of an LC macropixel may be located outside regions of high intensity incident light by configuring each macropixel with additional subpixels. FIG. 3G is a schematic illustration of one configuration of a macropixel 360 according to an embodiment of the invention, wherein macropixel 360 includes three subpixels 361-363. Graph 364 indicates the light intensity distribution of a single wavelength channel incident on macropixel 360 and graphs 365 indicate the light intensity distribution of two wavelength channels incident on macropixel 360, i.e., when macropixel 360 is configured for a narrow channel spacing. An electrode gap 366 separates subpixels 361 and 362, and an electrode gap 367 separates subpixels 362 and 363.

When macropixel 360 is configured to condition a single wavelength channel, all three subpixels 361-363 of macropixel 360 are controlled together as a single polarizing pixel. As shown in FIG. 3G, subpixels 316-363 may be configured so that electrode gaps 366 and 367 fall outside regions of high intensity light. In this way, optical energy lost to scattering is substantially reduced. As depicted in FIG. 3G, only regions of relatively low intensity incident light fall outside subpixels 361 and 362, and therefore optical energy lost to scattering is reduced.

When macropixel 360 is configured to condition two wavelength channels, subpixel 361 and 363 each serve as an independently controlled polarizing pixel, and subpixel 362 acts as a "dummy" pixel, i.e., an inactive region. One wavelength channel is conditioned by subpixel 361 and one is conditioned by subpixel 363. As depicted in FIG. 3G, only regions of relatively low intensity incident light fall outside subpixels 361 and 362, and therefore optical energy lost to scattering is reduced.

Alternate subpixel configurations, such as the subpixel configuration described above for macropixel 360, may also enable the processing of multiple alternate channel spacing modes. For example, the configuration illustrated in FIG. 3G, in which macropixel 360 is divided into three subpixels, may also allow macropixel 360 to process three wavelength channels independently, since each subpixel may act as an independently controlled polarizing pixel. Hence, an optical switching device incorporating a plurality of macropixels 360 may process a WDM signal having a first channel spacing, a second channel spacing that is one half that of the first channel spacing, or a third channel spacing that is one third that of the first channel spacing. For example, the first channel spacing may be at 100 GHz, the second at 50 GHz, and the third at 33 GHz.

Similarly, other subpixel configurations are contemplated that may increase the number of channel spacing modes into which a macropixel may be configured with relatively low loss of optical energy due to scattering by electrode gaps. For example, five subpixels may be used so that a macropixel may be configured to process 1, 2, 3, 4, or 5 wavelength channels. It is further noted that each macropixel may consist of subpixels having non-uniform widths and/or asymmetrical positions in the macropixel to optimize performance of each channel spacing mode.

Figure 4:
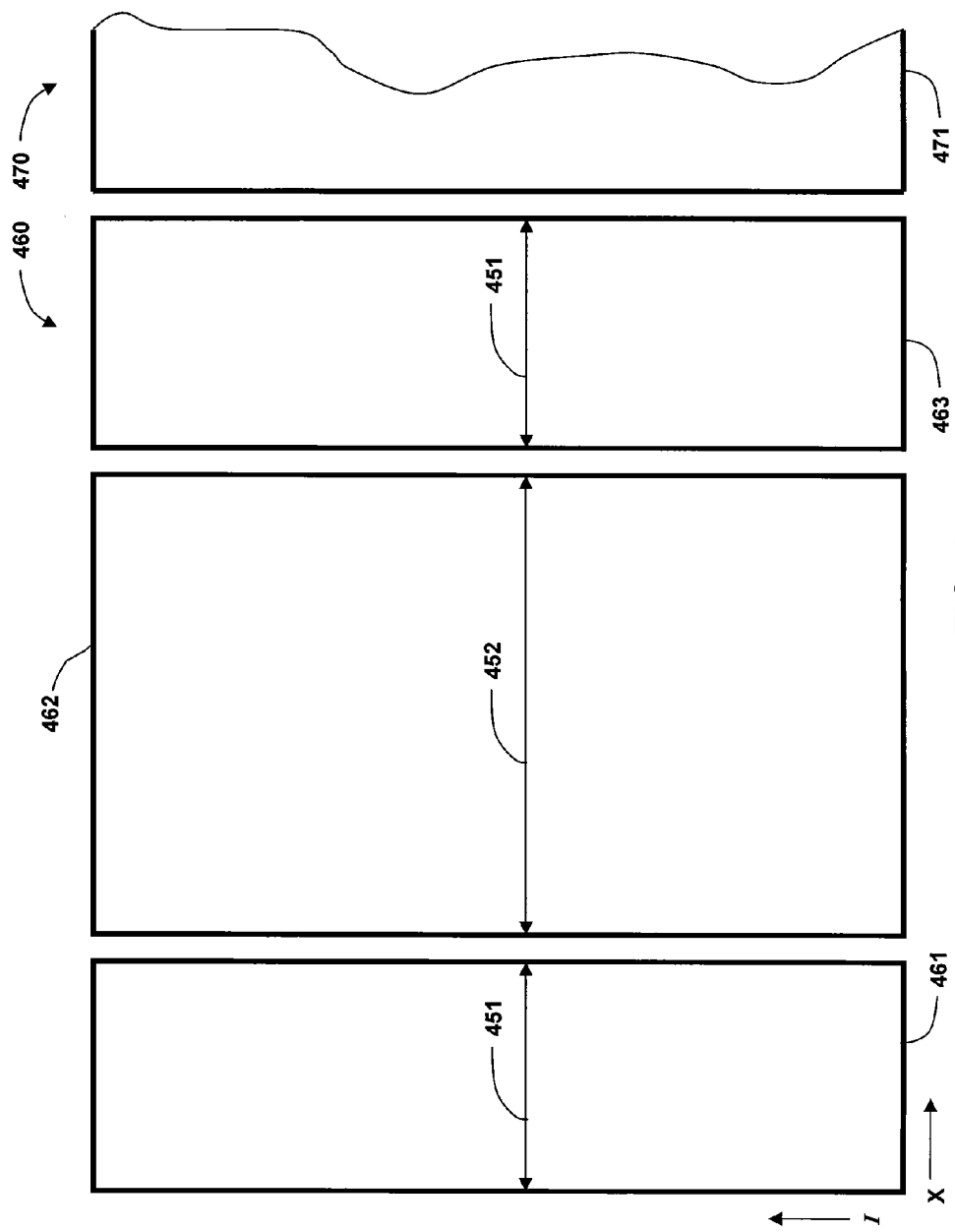
FIG. 4 schematically illustrates one configuration of a macropixel according to an embodiment of the invention, where the macropixel includes three subpixels.

In another embodiment, subpixels from adjacent macropixels are controlled in unison to produce macropixels that beneficially process a narrower channel spacing mode. For example, FIG. 4 schematically illustrates one configuration of a macropixel 460 according to an embodiment of the invention, where macropixel 460 includes three subpixels 461-463. As illustrated, subpixels 461-463 are not uniform in size. Namely, width 452 of subpixel 462 is approximately 50% of the width of macropixel 460, and width 451 of subpixels 461, 463 is approximately 25% of the width of macropixel 460. When macropixel 460 is configured to condition a single, wider wavelength channel, e.g., at a spacing of 100 GHz, all three subpixels 461-463 are controlled together as a single polarizing pixel. When macropixel 462 is configured to condition two narrower wavelength channels, e.g., at a spacing of 50 GHz, subpixel 462 serves as one independently controlled polarizing pixel. Subpixel 463, in conjunction with subpixel 471 of adjacent macropixel 470, serves as another independently controlled polarizing pixel, since subpixel 463 and subpixel 471 are controlled in unison. Similarly, subpixel 261 operates in conjunction with the proximate subpixel from the other adjacent macropixel (not shown). Thus, an array of macropixels makes up a coarse grid configured to process a first channel spacing, and the array of subpixels contained in the array of macropixels make up a grid configured to process a second, narrower channel spacing. In this embodiment, the subpixels disposed on the edge of each macropixel are controlled together with a subpixel disposed on the proximate edge of an adjacent macropixel to form some of the pixels for the narrower channel spacing. It is understood that other combinations of subpixels and macropixels are contemplated by the invention. To wit, a macropixel can include an arbitrarily large number of subpixels for maximum flexibility in the number of different channel spacings for which a macropixel array can be reconfigured.

While the foregoing is directed to embodiments of the present invention, other and further embodiments of the invention may be devised without departing from the basic scope thereof, and the scope thereof is determined by the claims that follow.

What is claimed is:

1. An optical switching device, comprising:
   a liquid crystal (LC) element operable in a first mode and a second mode and having a plurality of LC subpixels each of which is independently controllable, wherein at least two adjacent LC subpixels are controlled together in unison when the LC polarizing element is configured in the first mode to modulate the polarization of a light beam from a group of light beams having a first channel spacing, and each of the two adjacent LC subpixels is independently controlled when the LC polarizing element is configured in the second mode to modulate the polarization of a light beam from a group of light beams having a second channel spacing that is narrower than the first channel spacing; and
   an optical element positioned in the optical path of the light beams for changing the optical path of the light beams based on a polarization state of the light beams.

2. The optical switching device of claim 1, wherein the optical element is selected from the group consisting of a birefringent crystal and a Wollaston prism.

3. The optical switching device of claim 1, wherein the LC subpixels are separated by a gap less than one micrometer.

4. The optical switching device of claim 1, wherein the at least two adjacent subpixels comprise three adjacent subpixels, and when the LC polarizing element is configured in a third mode, the first subpixel is configured to modulate the polarization of a first light beam, the second subpixel is configured to modulate the polarization of a second light beam, and the third subpixel is positioned between the first and second subpixels and is configured as a dummy region.

5. The optical switching device of claim 1, wherein the light beams are wavelength channels demultiplexed from a wavelength division multiplexed (WDM) optical signal.

6. The optical switching device of claim 1, wherein the gap between the LC subpixels includes a plurality of interleaving features.

7. The optical switching device of claim 6, wherein the interleaving features are selected from the group consisting of rectangular, triangular, semicircular, and sinusoidal features.

8. An optical switching device comprising:
   at least one input port;
   at least two output ports;
   a liquid crystal (LC) array positioned between the input port and the output ports, the LC array including an array of macropixels each including a plurality of independently controllable LC subpixels, wherein the LC array is configured in a first mode to modulate the polarization of a light beam from a group of light beams having a first channel spacing, and in a second mode to modulate the polarization of a light beam from a group of light beams having a second channel spacing that is narrower than the first channel spacing; and
   an optical element positioned in the optical path of the light beams for changing the optical path of the light beams based on a polarization state of the light beams,
   wherein, in the first mode, the LC subpixels that form one macropixel are controlled in unison, and, in the second mode, each of the LC subpixels that form one macropixel is independently controlled.

9. The optical switching device of claim 8, wherein the optical element is selected from the group consisting of a birefringent crystal and a Wollaston prism.

10. The optical switching device of claim 8, wherein the LC subpixels are separated by a gap less than one micrometer.

11. The optical switching device of claim 8, wherein the LC array is configurable in a third mode and, in the third mode, a first of three adjacent subpixels is configured to modulate the polarization of a first light beam, a second of three adjacent subpixels is configured to modulate the polarization of a second light beam, and a third of three adjacent subpixels is positioned between the first and second subpixels and is configured as a dummy region.

12. The optical switching device of claim 8, wherein the light beams are wavelength channels demultiplexed from a WDM optical signal.

13. The optical switching device of claim 8, wherein the gap between the LC subpixels includes a plurality of interleaving features.

14. The optical switching device of claim 13, wherein the interleaving features are selected from the group consisting of rectangular, triangular, semicircular, and sinusoidal features.

15. The optical switching device of claim 8, wherein the at least two output ports comprise a first output port and a second output port, and the LC subpixels are configured to modulate the polarization of light beams so that essentially all optical energy contained in a light beam is directed to either the first output port or the second output port.

* * * * *